United States Patent
Martinez et al.

(10) Patent No.: US 7,373,049 B2
(45) Date of Patent: May 13, 2008

(54) OPTICAL DEFLECTION ARRAY

(75) Inventors: Christophe Martinez, Grenoble (FR); Serge Valette, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/583,908

(22) PCT Filed: Dec. 21, 2004

(86) PCT No.: PCT/FR2004/050740

§ 371 (c)(1), (2), (4) Date: Jun. 21, 2006

(87) PCT Pub. No.: WO2005/064376

PCT Pub. Date: Jul. 14, 2005

(65) Prior Publication Data

US 2007/0127866 A1 Jun. 7, 2007

(30) Foreign Application Priority Data

Dec. 23, 2003 (FR) .................................. 03 51184

(51) Int. Cl.
*G02B 6/42* (2006.01)

(52) U.S. Cl. ............................ 385/47; 385/16; 385/17; 385/18; 385/20

(58) Field of Classification Search ............ 385/16–18, 385/20, 21

See application file for complete search history.

(56) References Cited

U.S. PATENT DOCUMENTS

| | | | |
|---|---|---|---|
| 4,850,706 A | 7/1989 | Mikes | |
| 5,528,364 A | 6/1996 | Koike | |
| 6,166,805 A | 12/2000 | Mori et al. | |
| 6,330,102 B1 | 12/2001 | Daneman et al. | |
| 6,735,357 B2 * | 5/2004 | Jensen | 385/24 |
| 6,776,492 B1 * | 8/2004 | Chang | 353/99 |
| 2003/0133204 A1 * | 7/2003 | Chen et al. | 359/861 |

FOREIGN PATENT DOCUMENTS

| | | |
|---|---|---|
| EP | 0 962 796 | 12/1999 |
| FR | 2 821 678 | 9/2002 |
| FR | 2 821 681 | 9/2002 |

OTHER PUBLICATIONS

Hagelin P.M. et al., "Scalable Optical Cross-Connect Switch Using Micromachined Mirrors", IEEE Photonics Technology Letters, vol. 12, XP 000968693, pp. 882-884, 2000.

* cited by examiner

*Primary Examiner*—Brian Healy
*Assistant Examiner*—Hung Lam
(74) *Attorney, Agent, or Firm*—Oblon, Spivak, McClelland, Maier & Neustadt, P.C.

(57) ABSTRACT

An optical deflection matrix including at least two optical deflection modules each for providing, from an incoming beam having a given direction of propagation, an output beam having a direction of propagation taken in a set of potential directions. The modules each include a single deflection element of the incoming beam capable of assuming plural potential positions in relation to the potential directions of the set and two fixed return elements, on either side of the deflection element, a main potential position of the deflection element leading to a principal direction of the set, this principal direction being colinear with the given direction of propagation of the incoming beam, the principal directions of the deflection modules being located in the same plane. The matrix may find particular application to routing of beams.

40 Claims, 13 Drawing Sheets

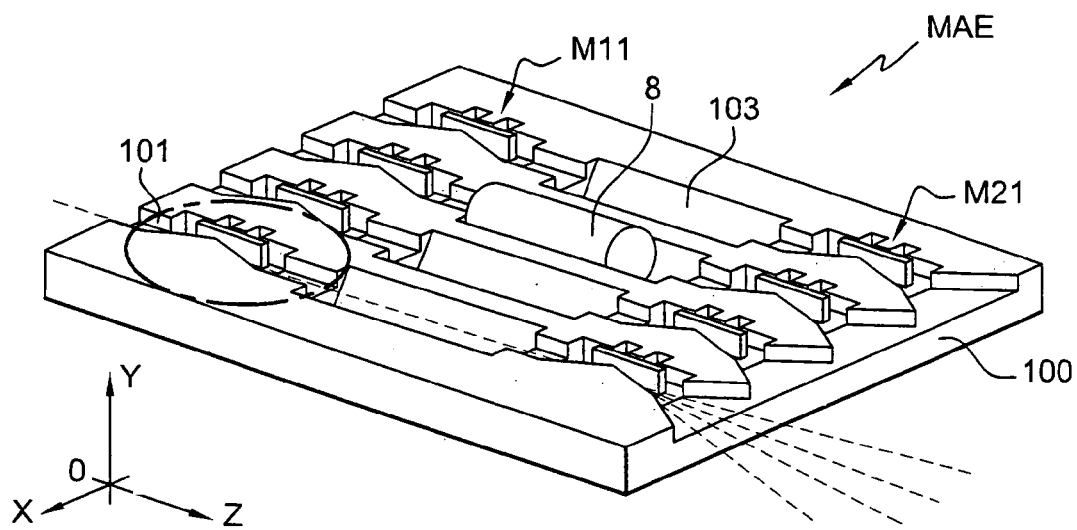
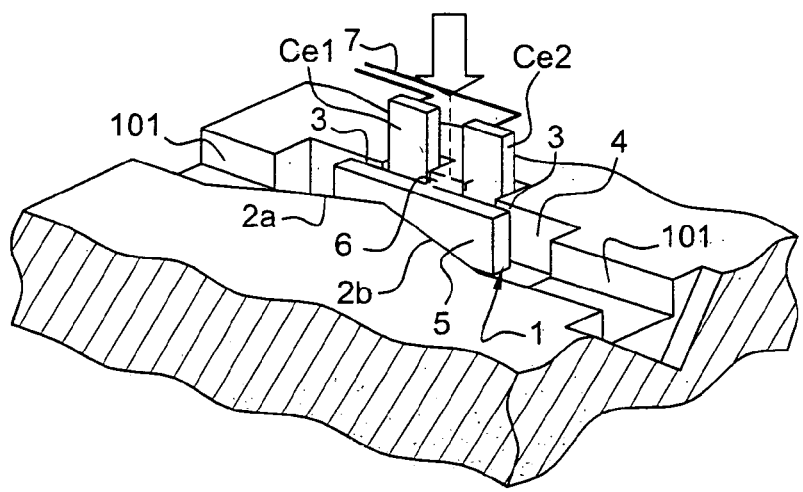
Fig. 4A
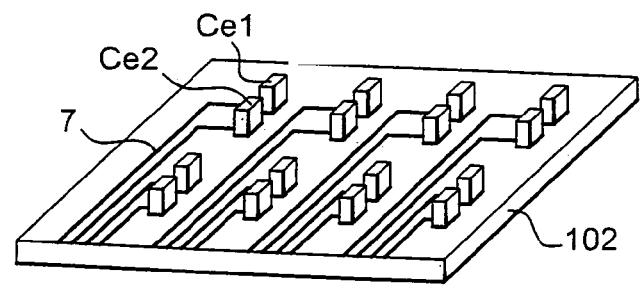
Fig. 4B

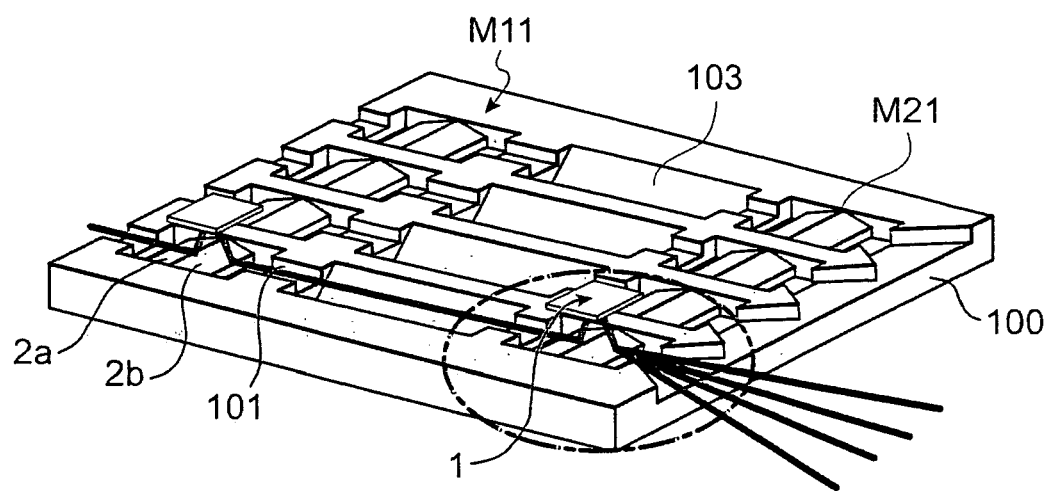
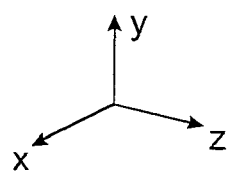
Fig. 4C
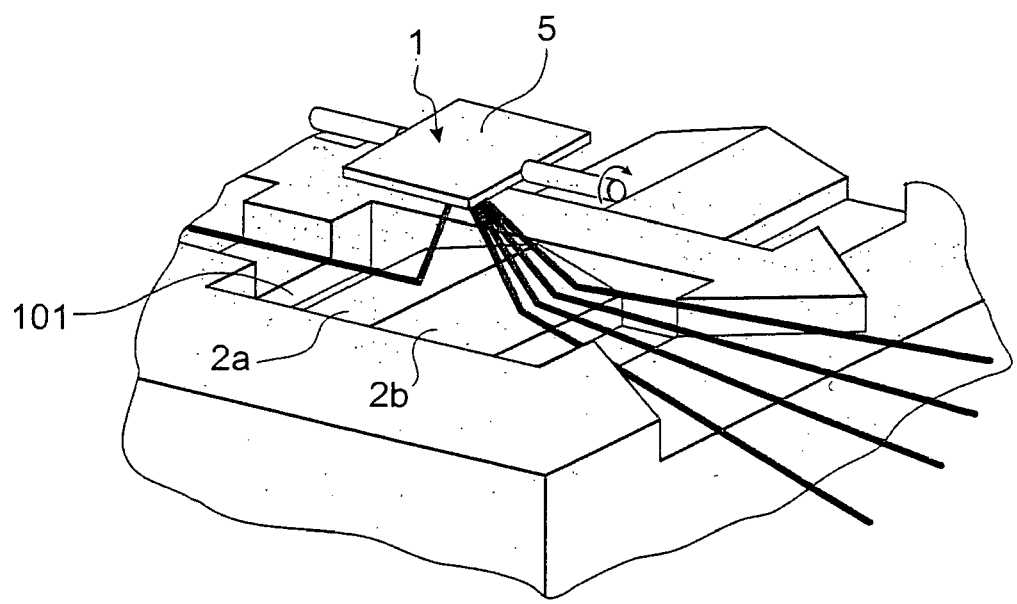

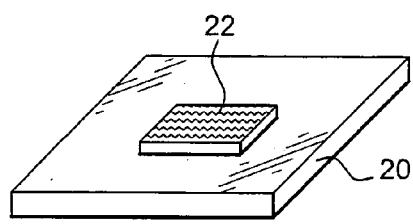
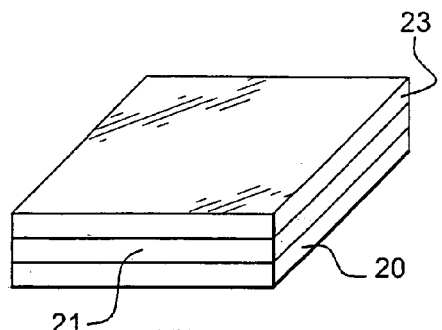
Fig. 5A  Fig. 5B
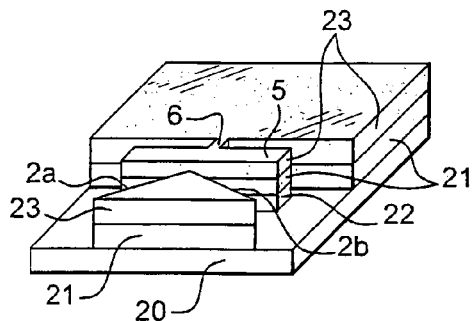
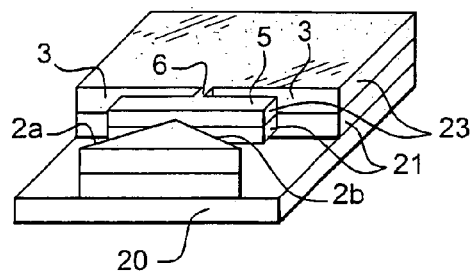
Fig. 5C  Fig. 5D

OPTICAL DEFLECTION ARRAY

TECHNICAL FIELD

The present invention relates to an optical deflection matrix comprising optical deflection modules. With an optical deflection module, it is possible to deviate an incident light beam.

The fields of application of these deflection matrices are numerous, for example, the routing of information transported over optical fibres, storing information, surface inspection via optical channels, telemetry and more particularly all sectors requiring spatial, in particular incremental light beam scanning.

STATE OF THE PRIOR ART

The development of high throughput telecommunications systems especially of the DWDM type (abbreviation of Dense Wavelength Division Multiplexing or dense wavelength multiplexing) renders optical deflection modules essential, as they form the building blocks in currently developing architectures. Nowadays, deflection modules are produced based on rotating mirrors, acousto-optic cells, and electrically addressable diffraction gratings.

Deflection modules having rotating mirrors, such as those shown in document [1] whereof the references are found at the end of this description, generally comprise a rotating mirror capable of assuming a large number of angular positions. The mirror cooperates with actuating means which may be analog electrostatic controls. These actuating means consume a large amount of energy and require a powerful and bulky power supply. The analog control requires highly complex electronic closed-loop controls difficult to manage. In all cases, the deflection module and its actuation are difficult to integrate into systems for which bulkiness is a critical parameter. These components are hot compatible with methods of collective manufacturing used in microtechnologies, and their manufacturing yield is low. This type of optical component has limitations in terms of industrialisation, due to its complexity both as regards manufacturing and operation. Their cost is consequently high. Optical deflection matrices comprising such modules therefore have all these drawbacks.

An optical deflection module and an optical routing device using such optical deflection modules have likewise been proposed, especially in documents [2] and [3], whereof the references are given at the end of this description. An optical deflection module is a simple deflection element capable of assuming a limited number of angular positions. Inserted between two successive deflection modules is an optical conjugation element. Reference may be made to FIGS. 13A, 13B which show a routing device derived from the teaching of these documents. These figures show, in tandem, two deflection elements 100 separated by an optical conjugation element 108. The latter deflection element 100 is followed by an optical conjugation element 108. Upstream from the deflection elements 100 is placed a shaping element 104. FIGS. 13A, 13B are distinguished from one another by the fact that the deflection elements 100 may be oriented according to distinct and perpendicular axes y, x. Each deflection element 100 is capable of providing from an incoming light beam $\phi 1a$ having a given direction $\delta 1$ an outgoing light beam $\phi 2a$ having a direction of propagation taken from among a set of potential directions $\delta 20$, $\delta 21$, . . .

With several deflection modules 100 such a routing device provides multiplication of the number of potential angular positions for the outgoing light beam of the module. These deflection modules are designed to develop a three-dimensional architecture. The optical conjugation elements 108 and the shaping element 104 are positioned according to distinct secant axes. This architecture poses a problem during fabrication, because of the complexity of encapsulation. These routing devices are therefore likewise bulky. Their utilisation is not easy either, as they require adjustment of the positioning of the deflection elements which is delicate. The same deflection element may have two distinct axes of rotation.

DESCRIPTION OF THE INVENTION

The aim of the present invention is to propose an optical deflection matrix capable of entering into the composition of routing devices which does not have the aforementioned disadvantages, especially the bulkiness, the complexity in production and operation and the high cost.

Another aim of the invention is to propose an optical deflection matrix which may be easily embodied in microtechnology.

Another aim of the invention is to embody an optical deflection matrix allowing significant integration and being capable of processing a maximum number of signals in a reduced space. It enables the design of devices having a maximum number of optical elements in the same substrate.

Another aim of the invention is to propose an optical deflection matrix comprising optical deflection modules having a deflection element capable of assuming positions of discrete predetermined deflection, which are perfectly reproducible, which require no electronic feedback control.

To attain these aims, the invention proposes an optical deflection matrix comprising at least two optical deflection modules each having a deflection element and two return elements structured so as to each have a single optical axis. Such a deflection matrix has a simple and compact structure.

More precisely, the present invention relates to an optical deflection matrix comprising at least two optical deflection modules each capable of providing:

from an incoming light beam having a given direction of propagation an outgoing light beam having a direction of propagation taken in a first set of potential directions, or from an incoming light beam having a direction of propagation taken in a second set of potential directions an outgoing light beam having a given direction of propagation. Each module includes a single deflection element of the incoming light beam capable of assuming several potential positions which are in relation to the potential directions of the first set or of the second set and two fixed return elements positioned on either side of the deflection element, a main potential position of the deflection element leading to a principal direction of the first set or of the second set, this principal direction being colinear with the given direction of propagation of the incoming light beam or of the outgoing light beam, the principal directions of the modules being located in the same plane.

The given direction is either a fixed direction, or is taken from among several potential directions.

It is advantageous that the first or the second set of potential directions comprises discrete predetermined directions so as to reduce the complexity of the control circuits of the deflection element. The control then advantageously is a digital one.

The deflection element of a module may be a mirror.

The same applies to the return element.

For the sake of simplification, at least one potential position of the deflection element of a module is a mechanically predetermined discrete position. The operation of such a deflection element is perfectly reproducible from one use to another or from one deflection element to an adjacent deflection element.

A abutment may define at least one mechanically predetermined position of the deflection element by stopping it.

To increase the number of mechanically predetermined positions, the abutment may be a double abutment comprising a tab capable of assuming two distinct positions, the tab being deflected in one of the positions.

Alternatively, a tab integral with the deflection element may be used, this tab being capable of assuming two distinct positions pressing on the abutment, the tab being deflected in one of these positions.

It is possible that the main potential position of the deflection element of a module is a position in which it is at rest.

The deflection element of a module may move in rotation about an axis perpendicular to at least one of the potential directions.

Alternatively, the deflection element of a module may move in rotation about an axis in a plane formed by the given direction and the main potential direction.

In another alternative, the deflection element of a module comprises at least two reflective faces positioned in different planes, this element being capable of moving in translation so as to generate rotation of the planes according to an axis formed by the intersection of said planes. In this way, the translation is equivalent to rotation of the planes according to an axis formed by the intersection of said planes.

The deflection element of a module may comprise a link arm which connects it to a fixed part.

The deflection element of a module may be placed on a mobile base.

In this latter configuration, the mobile base may be integral with at least one link arm which connects it to a fixed part.

An optical deflection module likewise comprises means for actuating the deflection element which may be of electrostatic type and comprise at least one pair of electrodes, optionally as interdigitated combs.

An optical deflection module may also comprise conduits to allow propagation of the incoming and outgoing light beams.

An optical deflection module may be embodied at least partially by techniques used in micro-electrics and/or by moulding techniques and/or by transfer techniques.

It is preferable that the return elements of a module should be symmetrical relative to a plane perpendicular to the main direction of potential propagation.

In the matrix, the modules are placed in the same plane.

In this way, the deflection planes of the deflection elements in their main position may be parallel or merged.

The optical deflection modules of the matrix will be advantageously positioned in at least one line and/or at least one column.

Two successive optical deflection modules in one line may be separated by an optical conjugation element.

In a same line, optical conjugation elements have colinear optical axes.

When the matrix comprises several optical deflection modules in a column and when the light beams each have a fixed direction of propagation, the directions of propagation are preferably parallel.

When the optical deflection matrix comprises several columns, the optical conjugation elements separating two optical deflection modules belonging to successive columns may be combined into a small bar.

The return elements of the deflection modules of the matrix may be grouped on the same substrate.

This substrate may include at least one compartment for an optical conjugation element.

The deflection elements of the modules may likewise be grouped on the same substrate.

Alternatively, it may be contemplated that in one module the deflection element is added so as to be opposite to the return elements.

At least one part of the deflection modules is grouped on a common substrate, this substrate comprising means for supporting the rest of the modules and at least one compartment for receiving one or more optical conjugation elements.

The present invention likewise relates to a routing device for coupling each of a plurality of optical input channels with any of a plurality of optical output channels conveying light beams. It comprises a thereby characterised optical input deflection matrix connected to the optical input channels, a thereby characterised optical output deflection matrix, connected to the optical output channels and a link module between the two input and output optical deflection matrices.

The routing device preferably comprises, upstream from the deflection input matrix, a module for shaping the light beams conveyed by the input channels.

In a similar manner, downstream from the optical output deflection matrix a shaping module may comprise light beams to be conveyed by the output channels.

Advantageously, the optical input channels and the optical output channels are parallel to one another.

At least one return device may be placed between the optical input deflection matrix and the link module and/or between the link module and the optical output deflection matrix.

BRIEF DESCRIPTION OF THE DRAWINGS

The present invention will be better understood from the description of the given embodiments, purely indicatively and in no way limiting, with reference to the appended drawings wherein:

FIGS. 4A, 4B, 4C show a first example of an optical deflection matrix according to the invention etched within a substrate, an auxiliary substrate bearing electrodes of the means for actuating the optical deflection modules making up this optical deflection matrix, as well as another example of an optical deflection matrix according to the invention respectively;

FIGS. 5A to 5D illustrate different steps for manufacturing an optical module deflection which may be used in an optical deflection matrix of the invention;

Identical, similar or equivalent parts of the different figures described hereinafter bear the same reference numerals so as to facilitate transition from one figure to the next.

The different parts shown in the figures are not necessarily according to a uniform scale, but render the figures more legible.

DETAILED DESCRIPTION OF PARTICULAR EMBODIMENTS

Figure 1A:
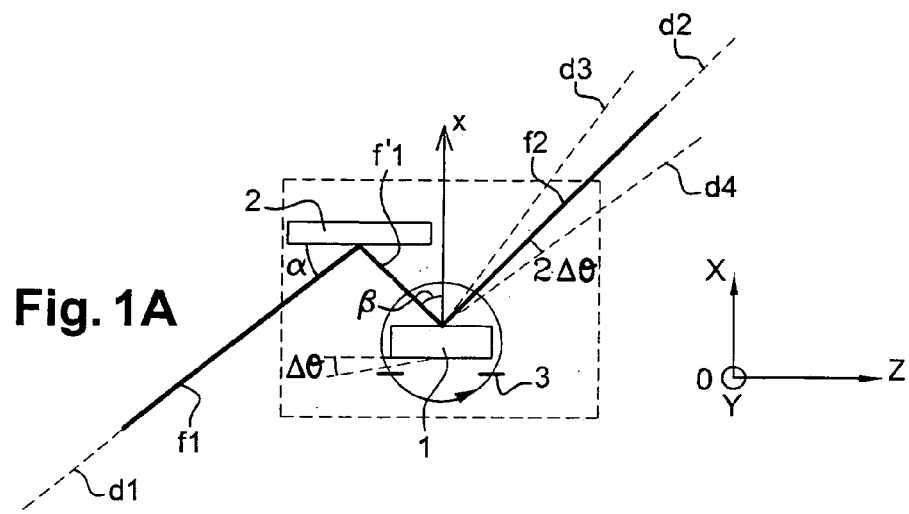
FIGS. 1A, 1B, 1C show in a top view several examples of an optical deflection module useful for understanding the invention.
Figure 1B:
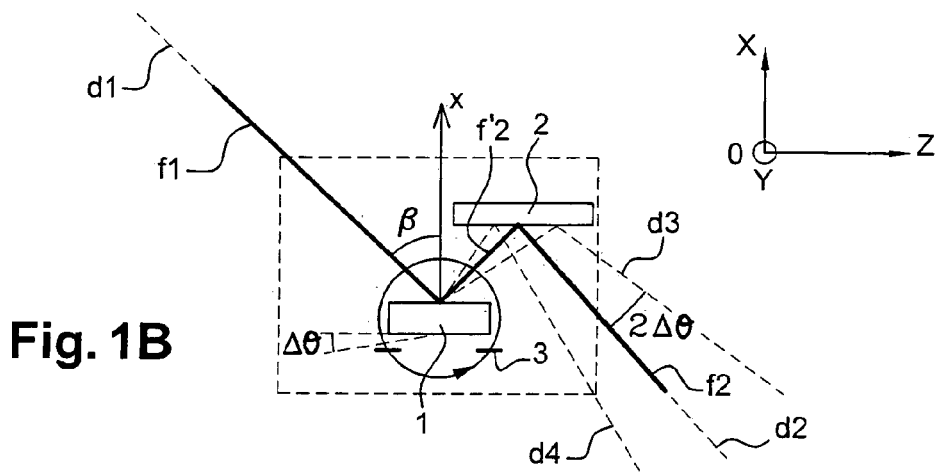
Figure 1C:
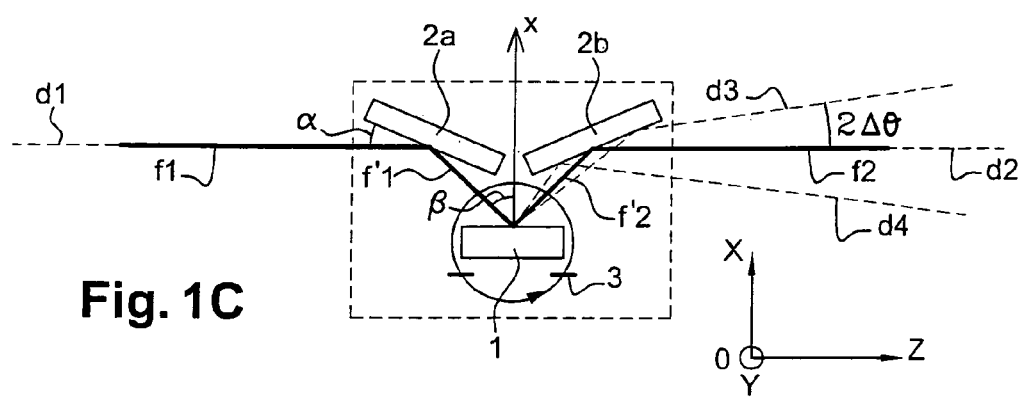

Reference is made to FIGS. 1A, 1B, 1C which show alternative embodiments of an optical deflection module useful for understanding the invention.

The optical deflection module comprises a single deflection element 1 associated with at least one return element 2, 2a, 2b. The return element may be a mirror.

In FIG. 1A, there is a single return element 2 only, placed upstream from the deflection element 3. In FIG. 1B, there is a single return element 2 only placed downstream from the deflection element 3. In FIG. 1C, the deflection element 3 is placed between two return elements 2a, 2b. This is the type of optical deflection module which will enter the optical deflection matrix object of the invention.

Such an optical deflection module is for receiving at least one incoming light beam f1, of a given direction d1, and providing an outgoing light beam f2 according to a direction d2 taken from among a set of potential directions d2, d3, d4. The set of potential directions may contain an infinity of potential directions between extreme directions which serve as terminals or on the contrary a finite number of discrete potential directions between terminals. This set of potential directions corresponds to a set of angular positions which in theory the deflection element might assume during shifting. In the example, these potential directions are coplanar, the set of these directions substantially forming a fantail.

In the examples of FIG. 1, the deflection element 1 is capable of assuming several potential angular positions. These positions are in relation to the potential directions d2, d3, d4 of the outgoing light beam f2. These positions are between terminals which correspond to end positions of the deflection element.

In FIG. 1A or 1B, the direction d1 of the incoming light beam f1 is parallel to one of the potential directions d2, d3, d4. This potential direction d2 is described as a main potential direction. The position of the deflection element 1 which leads to this main potential position is described as a main potential position. In FIG. 1C, the direction d1 of the incoming light beam is colinear with the main potential direction d2.

Colinear is understood to mean that the two directions belong to the same straight line; they are in extension of one another.

In the example of FIG. 1, the deflection element 1 is mobile about an axis, directed according to oy, perpendicular to at least one of the potential directions of the set. These angular positions may be obtained by rotation of the deflection element 1.

In an alternative embodiment described hereinbelow, rotation may be made about an axis which is included in a plane formed by the given direction d1 and the main potential direction d2.

The deflection element 1 comprises a deflection plane; for a mirror this is a reflective face. This plane is oriented in the example of FIG. 1C according to the plane yoz.

In alternatives described later on, the positions can no longer be obtained by rotation of the deflection element but are obtained by translation of the deflection element according to any direction. This translation induces deflection of the light beams according to axes of rotation with a direction parallel to at least one of the potential directions or else included in a plane formed by the given direction of propagation and the main potential direction.

The potential positions which the deflection element may assume, may advantageously be discrete predetermined positions. Alternatively, the deflection element may move continuously and assume a plurality of continuous positions.

Several discrete potential mechanically predetermined positions may for example be provided for the deflection element 1. In the described example, two mechanically predetermined end positions corresponding to the terminals were provided. In each of them, the deflection element 1 is stressed, and stopped against an abutment 3. The main potential position may be a median position between the two end positions in abutment. It corresponds in this case to a rest position. During operation, it is possible that the main potential position is not a position selected for the deflection element.

More than two or three discrete predetermined positions may be used, as this is obvious from FIG. 6.

The return element 2 is itself fixed, and may be placed downstream from the deflection element 1, as in FIG. 1A or upstream as in FIG. 1B. An interesting aspect of these structures is that the incoming light beam f1 may have a direction of propagation parallel to that taken by the outgoing light beam f2 when the deflection element is in the main potential position.

Two return elements 2a, 2b may be provided, with one upstream and the other downstream from the deflection element. With this configuration the colinearity between the directions may be guaranteed and not only the parallelism mentioned hereinabove.

In FIG. 1A, the light beam which arrives at the deflection element 1 is an intermediate incident light beam f1' since the incoming light beam f1 was oriented by the return element 2 placed upstream from the deflection element 1. The outgoing light beam f2 is directly the light beam deflected by the deflection element 1. In FIG. 1B the light beam which arrives at the deflection element 1 is the incoming beam f1 of the optical deflection module. The light beam which is deflected by the deflection element 1, is a deflected intermediate beam f'2 different from the outgoing light beam f2. The outgoing light beam f2 is the intermediate deflected light beam f'2 reoriented by the return element 2.

FIG. 1C combines the structures of FIGS. 1A and 1B. The light beam which arrives at the deflection element 1 is an intermediate incident light beam f'1 corresponding to the incoming light beam f1 after orientation by the return element 2a, and the light beam f'2 deflected by the deflection element 1 is an intermediate deflected light beam which will be sent by the return element 2b to provide the outgoing light beam f2 of the optical deflection module. This is the type of optical deflection module which will enter the composition of an optical deflection matrix of the invention.

The deflection element 1 may for example be a deviation mirror. These mirrors have a deflection (in this case reflection) plane which corresponds to the plane of their reflective face.

In FIG. 1, the light beam which arrives at the deflection element 1 is the incoming light beam f1 or the intermediate light beam f'1 has incidence equal to $\beta$ (angle made by the light beam on the deflection element relative to a normal to the deflection plane). If the deflection element turns by an angle $\pm\Delta\theta$ about the axis y, the beam deflected by the deflection element 1 undergoes deviation of $2\Delta\theta$. In the example of FIG. 1C, with two return elements 2a, 2b, the two mirrors 2a, 2b are symmetrical relative to the plane yox, i.e. relative to a plane perpendicular to the main potential direction d2. In this way if the incoming beam f1 is colinear with the axis z and if the deflection element 1 is in a main potential position, the output beam f2 is colinear with the axis z. If the deflection element 1 either turns by an angle $+\Delta\theta$, or by an angle $-\Delta\theta$, the outgoing light beams f2 in these two positions will be symmetrical relative to the axis z and offset from this axis z by $2\Delta\theta$. It is shown that for a light beam to arrive at the deflection element 1 with an angle $\beta$, it is necessary for the angle $\alpha$ of inclination of the return elements 2a, 2b relative to the beams which arrive at them, to be equal to $\alpha=\pi/4-\beta/2$. In FIG. 1, an angle $\beta$ equal to $\pi/4$ was chosen. But of course this value is not limiting.

In the examples of FIG. 1, the given direction of the incoming light beam is a fixed direction. But such an optical deflection module is reversible. This means that it may likewise receive an incoming light beam 37 which has a direction taken from among a set of potential directions and deliver an outgoing light beam 35 having a fixed direction as illustrated by the optical deflection module M'a or M'b of the output matrix MAS of FIG. 3A. The outgoing light beam is colinear with the main potential direction of the set of potential directions obtained with the deflection element in a main potential position.

Such an optical deflection module then redirects the incoming light beam 37 to make it colinear with the incoming light beam f1a, f1b of an optical deflection module Ma, Mb of the input matrix MAE.

Alternatively, the optical deflection module may intercept an incoming light beam having a direction taken from among a set of potential directions and deliver an outgoing light beam having a direction likewise taken from among another set of potential directions. This alternative is illustrated by the optical deflection modules M21 of the second column of the input matrix MAE or the optical deflection modules M'11 of the first column of the output matrix MAS of FIG. 3B.

The present invention relates to an optical deflection matrix which comprises at least two optical deflection modules with two thereby defined return elements. The principal directions of the different modules are located in the same plane.

Figure 2:
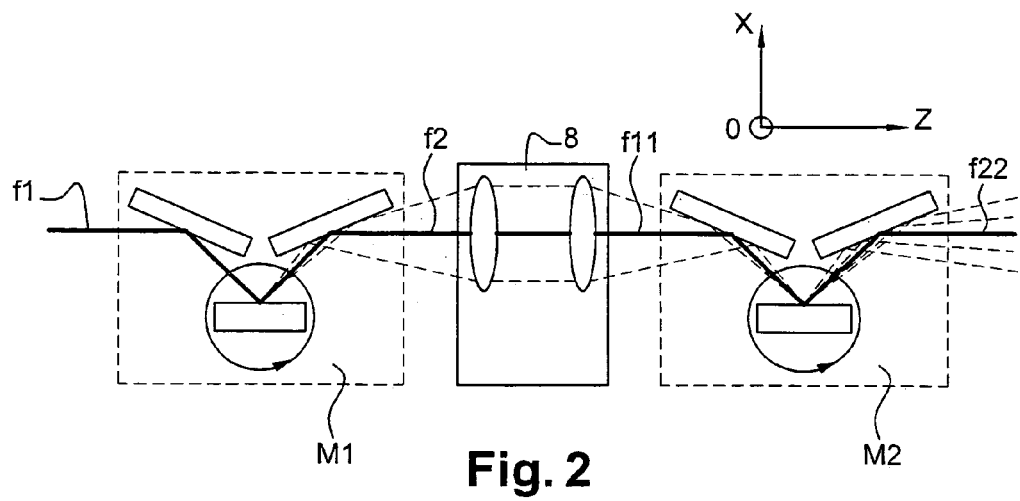
FIG. 2 shows a first example of an optical deflection matrix according to the invention.
Figure 3A:
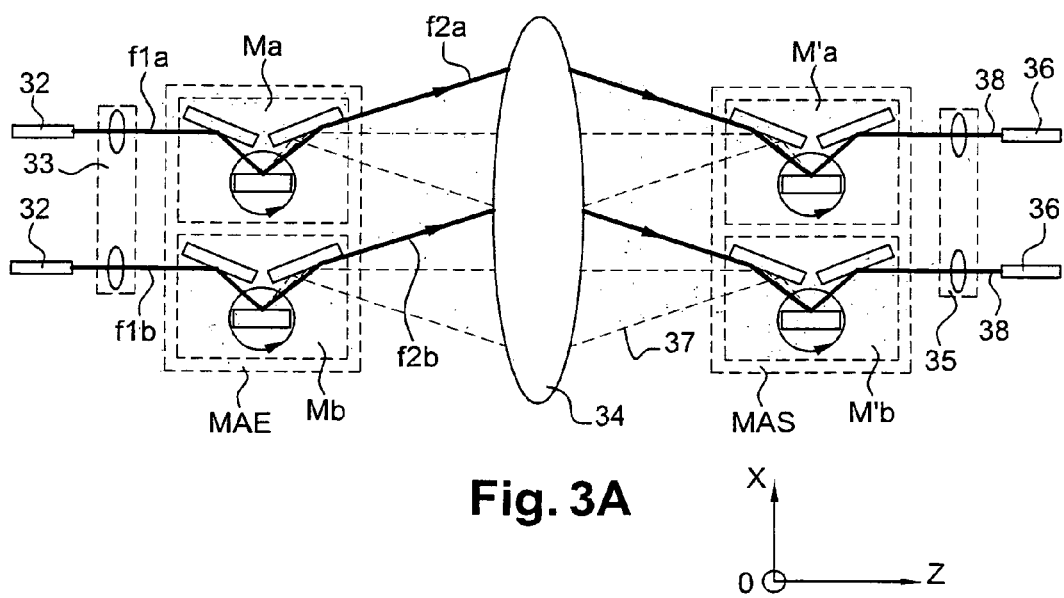
FIGS. 3A, 3B, 3C show examples of optical deflection matrices according to the invention used in routing devices according to the invention.

FIG. 2 shows a first example of a matrix according to the invention. FIG. 3A illustrates another example of such an optical deflection matrix inside a routing device which will be described hereinbelow.

Figure 3B:
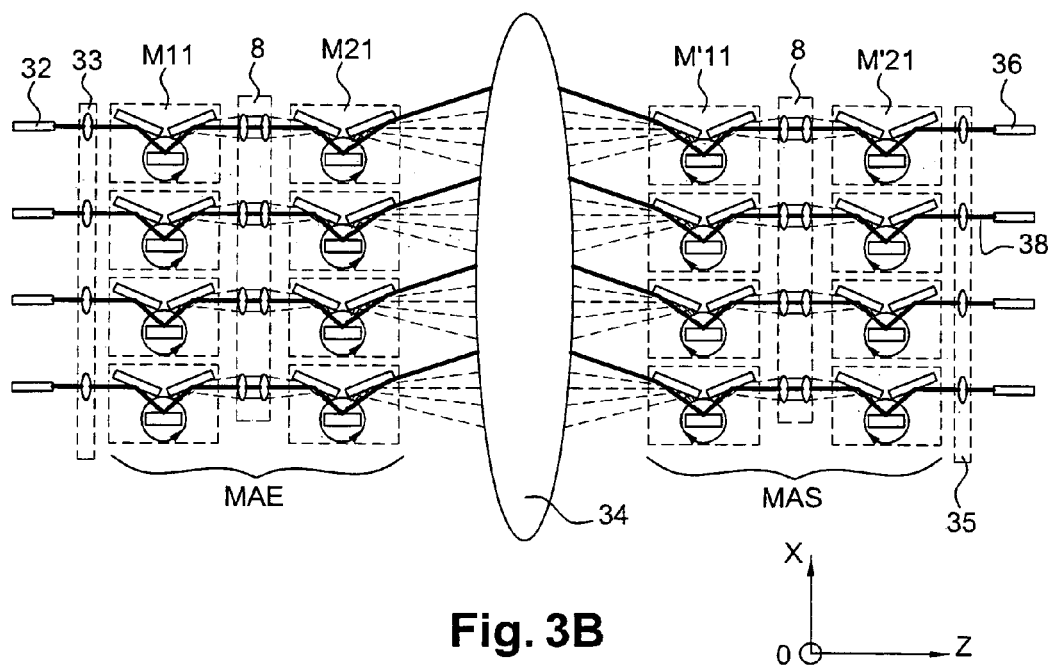

The optical deflection matrix therefore comprises several optical deflection modules which are contained in the same plane xoz embodied in the example of FIGS. 2 and 3A, 3B by the plane of the sheet. The deflection elements 1 therefore have deflection planes which are preferably parallel or combined when they are all in the main potential position. This configuration corresponds to the case where there are two return elements.

These optical deflection modules are positioned in at least one line and/or at least one column. In FIG. 2, there is a single line only, and the optical deflection modules M1, M2 are in tandem. They comprise two return elements.

The first optical module M1 provides from an incoming light beam f1, a first outgoing light beam f2 capable of assuming n (n is an integer greater than or equal to two) discrete predetermined potential directions (corresponding to n discrete mechanically determined positions of the deflection element of the module M1). The optical deflection module M2, following in tandem, provides from a second incoming beam f11 a second outgoing light beam f22 capable of assuming, for a position of the second incoming light beam f11, m discrete predetermined potential directions (m is an integer greater than or equal to 2) corresponding to m discrete mechanically determined positions of the deflection element of the module M2. The second incoming light beam f11 corresponds to the first output beam f2 having passed through an optical conjugation element 8. It may assume n discrete predetermined potential directions, inferred from those of the first outgoing light beam f2. Overall, in the matrix, the second outgoing light beam f22 is capable of assuming mxn discrete predetermined potential directions. The optical conjugation element 8, inserted between two successive modules M1, M2 of the cascade provides angular enlargement between the different optical deflection modules. This optical conjugation element 8 may be embodied by a pair of lenses for example. The optical deflection modules may either be identical or not. Such a matrix has a role of multiplier of directions. If a matrix comprises in the same line deflection modules having two return elements and several optical conjugation elements 8, the latter are aligned.

In the optical deflection matrix of the invention, the light beams propagate in free space. All the same guide elements may be used locally for example in a conjugation element 8.

FIG. 3A shows a routing device 2×2 according to the invention. It comprises an optical input deflection matrix MAE and an optical output deflection matrix MAS, these matrices being according to the present invention. The optical deflection matrices are placed in the same plane. The optical input deflection matrix MAE comprises several k (two) optical deflection modules Ma, Mb positioned in a column. There are therefore k (two) incoming light beams f1a, f1b. In this example the k incoming light beams f1a, f1b are parallel. Each of the modules Ma, Mb intercepts one of the incoming light beams f1a, f1b and provides a deflected outgoing light beam f2a, f2b. Each of the outgoing light beams f2a, f2b is capable of assuming 1 predetermined potential directions corresponding to 1 predetermined mechanically positions of the deflection element of the modules Ma, Mb and there are k outgoing light beams f2a, f2b.

Figures 11A, 11B:
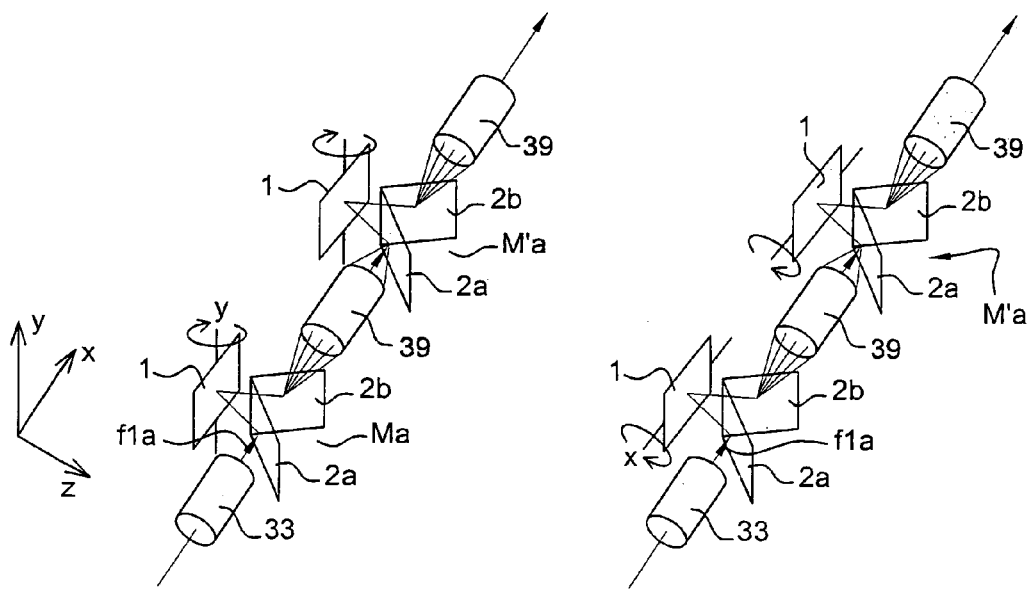
FIGS. 11A, 11B show two examples of optical deflection matrices according to the invention.
Figures 13A, 13B:
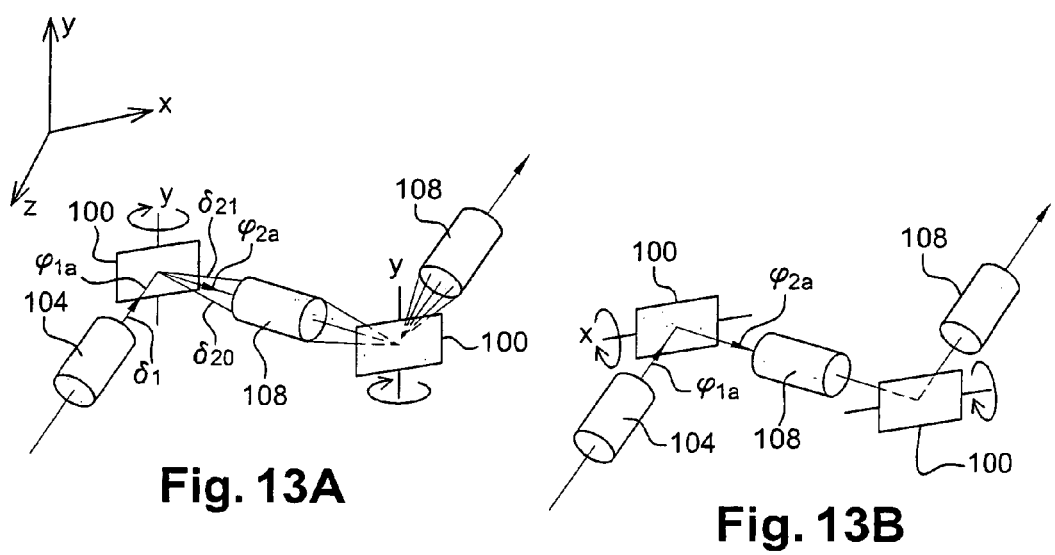
FIGS. 13A, 13B, already described, show two routing device examples from the prior art based on simple deflection elements.

FIGS. 11A, 11B show similarly to FIGS. 13A, 13B already described, in three dimensions, two examples of a line of a matrix according to the invention. Such a line comprises in tandem a shaping element 33, a first deflection module Ma having two return elements, a first optical conjugation element 34, a second deflection module M'a having two return elements, a second optical conjugation element 34; a third deflection module follows but it has not been illustrated so as not to crowd the figures. Two deflection modules Ma, M'a frame an optical conjugation element 34. The conjugation elements are aligned, their optical axes are colinear. The shaping element 33 is also aligned with the conjugation elements 34. Its optical axis is colinear with those of the shaping elements 34. The deflection element 1 of each of the deflection modules Ma, M'a is capable of moving in rotation about an axis y which is perpendicular to at least one of the potential directions, namely the principal direction. It is evident in this example that the structure is linear, not the case in the prior art. The principal directions of the two deflection modules Ma, Ma' are colinear. The direction of propagation of the incoming light beam f1a is also colinear with these principal directions. FIG. 11B is similar to FIG. 11A with the exception that the deflection element 1 of the deflection modules is mobile about an axis x which is parallel to at least one of the potential directions. This is the principal direction. This axis is contained in a plane formed by the given direction and by the main potential direction.

In these two examples (FIGS. 2 and 3A), the main potential positions are not always discrete positions given to the deflection element during operation. The latter may assume only two end positions. If the main position is used, this adds an additional direction to the light beam.

In the main position, the deflection planes of the deflection elements of all the modules are parallel or combined. In other configurations, this will not be the case.

Prior to a more detailed description of the routing device of FIG. 3A, other examples of an optical deflection matrix according to the invention which are illustrated in FIGS. 4A, 4B and 4C will be described. These are optical deflection matrices having several lines and several columns similar to that MAE of FIG. 3A. All its optical deflection modules M11, M21 are placed in the same plane xoz, within the same base substrate 100 (of principal plane xoz), and are distributed in four lines and two columns. The matrix therefore comprises 4×2 optical deflection modules. The modules of one column are designated as M11 and the modules of the other column are designated as M21.

Each of the modules is similar to that of FIG. 1C with two return elements 2a, 2b placed on either side of a deflection element 1 of the mirror type. These optical deflection modules are etched or moulded in the thickness of the base substrate 100. Conduits 101 are also etched or moulded in the base substrate 100 to allow propagation of the incoming light beams, the outgoing light beams, irrespective of their direction, and the intermediate light beams. In this way alignment of the corresponding elements in the different columns and/or lines may be easily undertaken and no adjustment of the positioning of the deflection elements and of the return elements is necessary.

A zoom helps to distinguish in detail an optical deflection module. The return elements 2a, 2b are made by two V-shaped walls obtained by etching or moulding. They are substantially perpendicular to the plane xoz of the base substrate 100 in FIG. 4A. In FIG. 4C, the return elements 2a, 2b are integrated in the base substrate 100 and extend to the bottom of the conduits 101. The return elements 2a, 2b are symmetrical relative to a plane which is perpendicular to the main potential direction in the two examples.

In FIG. 4A, the deflection mirror 1 is placed in a cavity 4 made in the base substrate 100 having a bottom and walls. It comprises a wafer 5 having a front reflective face, opposite the return elements 2a, 2b and a rear face integral with a link arm 6 for connecting it to the base substrate 100, at the level of a wall of the cavity 4. The reflective face is substantially perpendicular to the plane xoz. This link arm 6 plays the role of a hinge, by enabling the wafer 5 to pivot about an axis directed according to oy and passing equally by the end of the link arm 6 integral with the base substrate 100 or else by the end of the link arm 6 integral with the wafer 5. The wafer 5 and the link arm 6 are spaced from the bottom of the cavity 4. The displacement of the wafer 5 is made, in the manner of a rocker, in the plane xoz and the reflective face of the wafer 5 remains substantially perpendicular to the plane xoz.

The deflection element 1 may assume several angular positions which are advantageously discrete and predetermined and whereof some extremes are embodied by abutments 3 formed by zones, of appropriate geometry, of the wall of the cavity located opposite the rear face of the wafer 5. In FIG. 4A, the deflection elements 1 are in an angular rest position without contact with the abutments 3; in this median position the link arm 6 is in the rest position, unstressed.

Actuating means for the deflection element 1 will now be described. In this example, these are electrostatic means with several pairs of electrodes formed from a fixed electrode and a mobile electrode. The rear face of the wafer 5 is equipped on either side of the link arm 6 with two mobile electrodes e1, e2. These may be metallised zones. The wall of the cavity 4 comprises, opposite each of these mobile electrodes e1, e2, a fixed electrode ce1, ce2 respectively so as to form the pair. These fixed electrodes are connected by conductors 7 to a control circuit (not illustrated) intended for providing signals for controlling the position to be adopted by the deflection element 1.

The fixed electrodes ce1, ce2 and the conductors 7 may be embodied on an auxiliary substrate 102 such as that shown in FIG. 4B which is turned over and then added and fixed for example by adhesion on the base substrate 100.

In the absence of a signal, the deflection element 1 is in its median rest position. When a signal is applied to the fixed electrode ce1, there is attraction of the facing mobile electrode e1 and pivoting of the link arm 6 such that the end of the wafer 5 located to the side of the mobile electrode e1 comes to rest against the facing abutment 3. For as long as the signal is applied, the wafer 5 remains in abutment. When a signal is applied to the other fixed electrode ce2, the same phenomenon occurs on the other abutment.

The presence of the two return elements 2a, 2b allows the different modules of the matrix to be positioned in parallel lines and in columns parallel to one another respectively.

In the base substrate 100 one or more compartments 103 may be provided, having to collect optical conjugation elements 8, each inserted between two successive modules of the same line. These compartments may be V-shaped grooves, allowing precise positioning and adjustment of the optical conjugation elements 8 in the form of a rotating cylinder. If necessary, the whole substrate 100 is metallised to obtain a reflection coefficient as good as possible.

The fact that the modules M11, M21 are distributed over several substantially parallel columns allows the use of optical conjugation elements, for example in the form of pairs of lenses, combined into a small bar placed substantially parallel to a column of modules as illustrated in FIG. 3A described hereinbelow. Here also, this small bar facilitates the adjustment and the positioning of these pairs of lenses.

In the zoom of FIG. 4C, a single deflection element optical 1 is illustrated which is added above the substrate 100 so as to be opposite to the return elements 2a, 2b with which it will cooperate. It comprises as mentioned hereinabove a wafer 5 having a front reflective face located facing the return elements 2a, 2b. The wafer 5, in the main position, is parallel to the plane xoz. The deflection element 1 may assume several predetermined positions by rotating about an axis directed according to the axis oz. A light beam is shown, designated by reference numeral F. The potential directions which it may take are embodied.

Figure 12A:
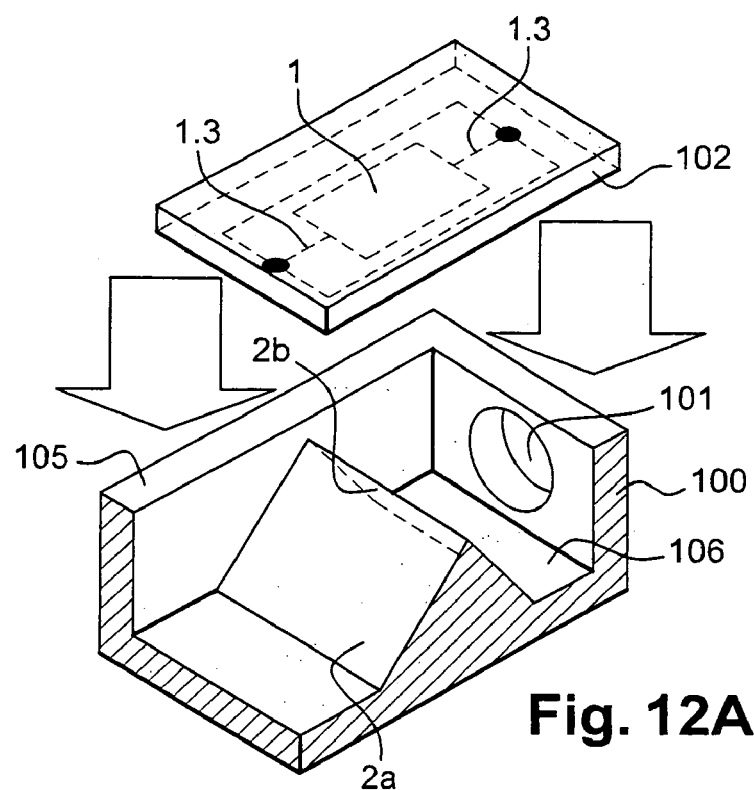
FIGS. 12A, 12B respectively show an example of a deflection module entering the composition of an optical deflection matrix of the embodiment illustrated in FIG. 11B, and in three dimensions a deflection matrix using such a deflection module.

A deflection module similar to those shown in FIG. 11B will now be described, in which the deflection element is capable of moving in rotation about an axis which is contained in a plane formed by the main potential direction and the given direction. Reference is made to FIG. 12A. Only a part of the deflection module is located on the base substrate 100, i.e. the return elements 2a, 2b. The light beams are not shown. The deflection element 1 is placed on an auxiliary substrate 102. Actuating means, sketched as a block, for example similar to those described above, may likewise be placed on the auxiliary substrate 102. The deflection element 1 is integral with two hinges 1.3 which connect it to the auxiliary substrate 102. The auxiliary substrate 102 is recessed in the vicinity of the deflection element to allow it to rotate. The base substrate 100 comprises means 105 for supporting the auxiliary substrate 102. In the example, the base substrate 100 comprises a cavity 106 in which the return elements 2a, 2b are placed, and this cavity is delimited by walls 105 which embody the support means. The return elements 2a, 2b are symmetrical relative to a plane which is perpendicular to the main direction of potential propagation. The auxiliary substrate 102 is added and fixed for example by adhesion to the base substrate 100.

The opening designated as 101 in one of the walls 105 embodies a conduit allowing propagation of an incoming light beam or an outgoing light beam, irrespective of their directions of propagation.

Figure 12B:
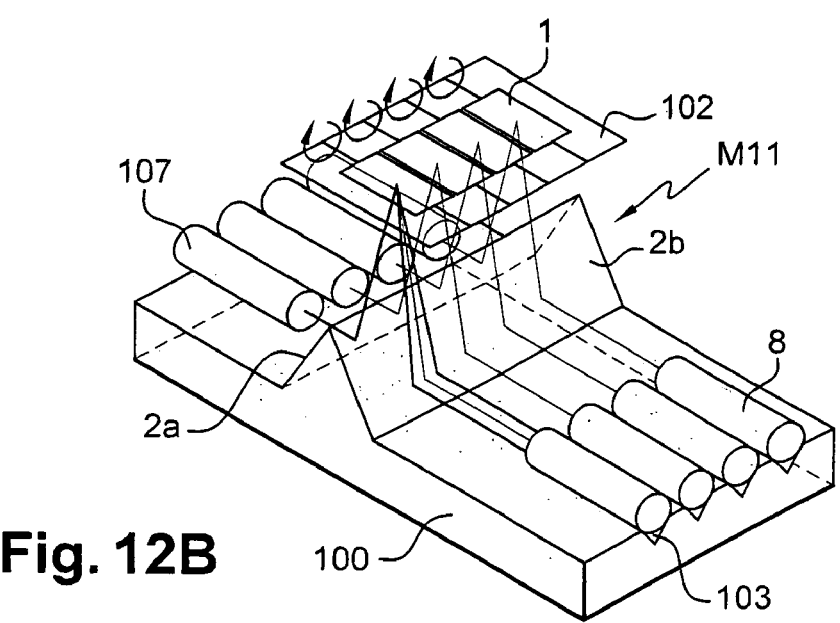

FIG. 12B shows, as in FIG. 4A, an example of a matrix according to the invention utilising deflection modules similar to those of FIG. 12A. This matrix comprises only a single column of deflection modules M11. Using conventional techniques known in microelectronics, it is easy to make on the same base substrate 100, several pairs of return elements 2a, 2b. The very fact of placing the deflection elements 1 on the auxiliary substrate 102 makes this easy to do using conventional planar microelectronics technology. The base substrate 100 may comprise, as mentioned hereinabove, compartments 103 for one or more optical conjugation elements 8. Upstream from the deflection modules are illustrated shaping elements 107.

Reference is now made to an example of the manufacturing process of an optical deflection module according to the present invention, which process uses techniques of microelectronics. This optical deflection module has a deflection element 1 similar to that shown in the zoom of FIG. 4A. The pattern of the cavity 4 and the abutments 3 has been simplified relative to the example of FIG. 4A.

Of course, this process may be used to make a matrix of modules and even a routing device comprising a matrix of input optical deflection modules and a matrix of output optical deflection modules. The etching of the different modules is carried out simultaneously. It suffices to likewise provide placements or compartments for the other optical elements which make up the optical deflection matrix (as that designated by 4 in FIG. 4A) or which make up the routing device. These other optical elements will be described hereinbelow in reference to FIGS. 3B, 3C.

Reference is made to FIGS. 5A to 5D. One starts with a substrate formed by a pair of layers 20, 21 (with a lower layer 20 and an upper layer 21), insulating or semi-conducting layers for example, sandwiching a sacrificial layer 22 for example in silicon oxide. The upper layer 21 of the pair has a thickness of the order of several hundreds of micrometers. The sacrificial layer 22 occupies only part of the upper surface of the two layers 20, 21 of the pair, this part corresponding at least to the hold which the wafer forming the deflection element and the link arm should have.

FIG. 5A shows the lower layer 20 of the sandwich and the sacrificial layer 22, whereas FIG. 5B shows the totality of the sandwich, but in this case the sacrificial layer is no longer visible.

The contour of the wafer 5 and of the link arm 6 leading to the deflection element 1 are delimited by a step of deep etching in the upper layer of the pair and in the sacrificial layer, stopping on the lower layer of the pair. The V-shaped surfaces leading to the return elements 2a, 2b (FIG. 5C) are also made. The link arm 6 has an end integral with the upper substrate 23 of the pair. The contour of the abutments 3 is likewise provided. The sacrificial layer 22 under the wafer 5 and under the link arm 6 is then eliminated so as to release it. The wafer 5 and the link arm 6 are overhanging the lower layer 20. The reflective faces are obtained by metallisation.

Other manufacturing techniques may be used. Moulding plastic material for example based on polymer, either doped or not may be contemplated. The moulding technique lends itself well to the production of these optical deflection modules, these optical deflection matrices and these routing devices, since it produces rather thick pieces at low cost. Metallisation of the polymer is desirable to capitalise on a satisfactory reflection coefficient for the return and deflection elements.

Figure 6A:
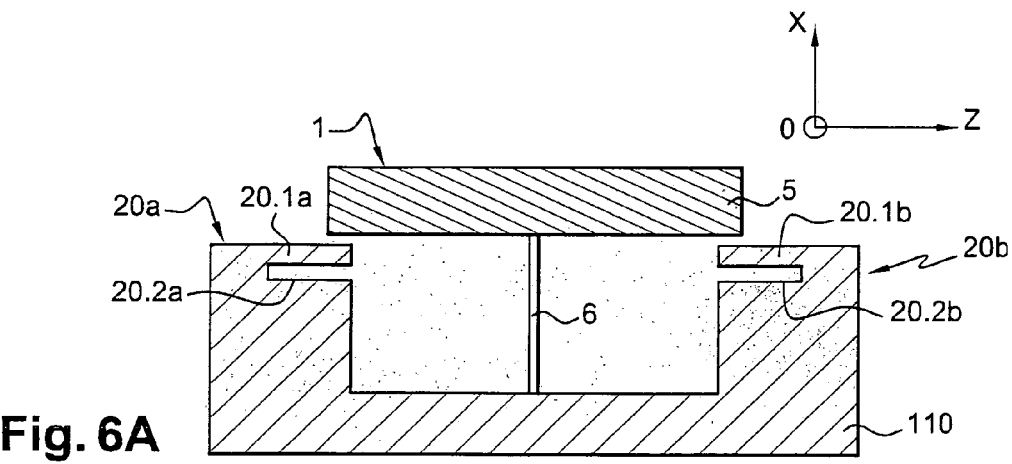
FIGS. 6A to 6F illustrate two examples of optical deflection modules with double abutment which may be used in an optical deflection matrix of the invention.
Figure 6B:
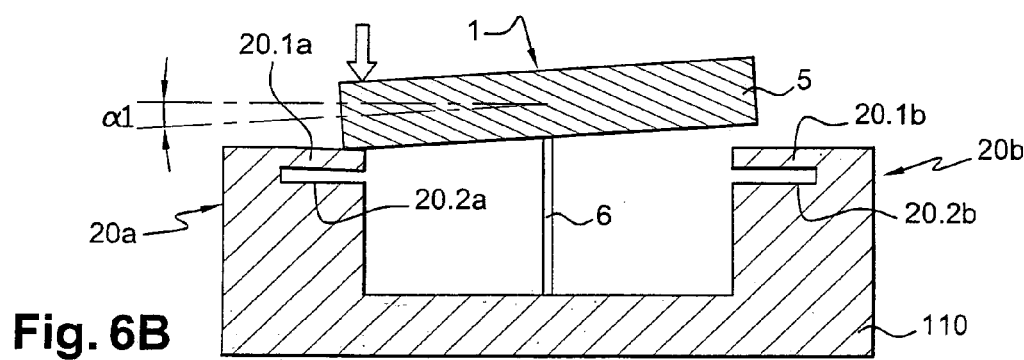
Figure 6C:
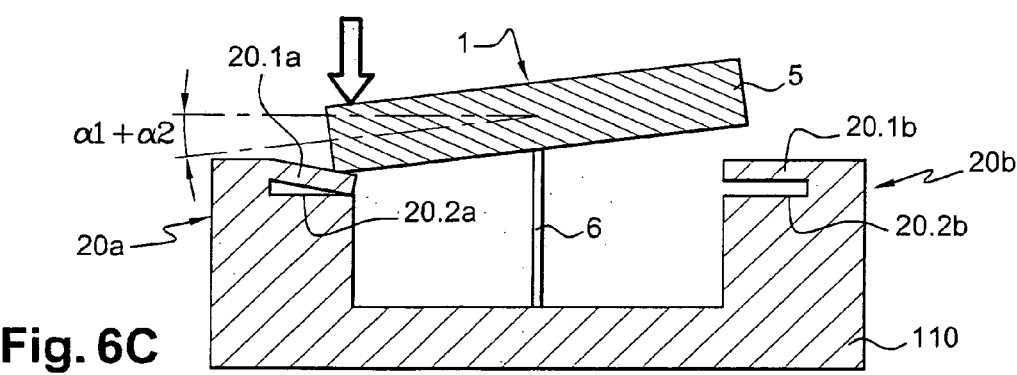

Now another example of an optical deflection module according to the invention will be shown. Reference is made to FIGS. 6A to 6C. These figures are partial figures, and no return element is shown so as not to crowd the figures. As in the preceding figures, the deflection element 1 of mirror type assumes the form of a wafer 5 integral with a link arm 6 connected to a fixed support 110. In the example of FIG. 4, the support was embodied by the base substrate. The return elements would also be integral with this support 110. The deflection element 1 is capable of assuming four discrete angular predetermined positions defined mechanically by two double abutments 30a, 30b, integral with the support 110. These double abutments are positioned as the single abutments 3 of FIG. 4A. The expression double abutment means an abutment which is capable of assuming two distinct positions according to the level of stress it receives.

FIG. 6A shows the deflection element 1 in a main position, without contact with the double abutments 20a, 20b. Each double abutment 20a, 20b comprises a first abutment

20.1$a$, 20.1$b$ and a second abutment 20.2$a$, 20.2$b$ in tandem. The first abutment 20.1$a$, 20.1$b$, in the form of a tab, is capable of stopping the wafer 5, thereby defining for the deflection element 1 a first mechanically defined position. This position is illustrated in FIG. 6B, with the wafer 5 coming to abut on the first abutment 20.1$a$. The wafer 5 has turned by an angle $\alpha 1$ relative to the rest position of FIG. 6A. This rotation is performed about an axis directed perpendicularly to the plane of the sheet passing through the end of the link arm 6 on the wafer 5 side. Due to its tab shape the first abutment 20.1$a$, 20.1$b$ is capable of bending if pressure greater than a threshold pressure is applied to it. It may then swing over until it abuts against the second abutment 20.2$a$, 20.2$b$ which is fixed. In FIG. 6C, the wafer 5, although remaining supported against the first abutment 20.1$a$, was inclined by an angle $\alpha 2$ and has assumed another mechanically defined position. Definitively, the deflection element 1 has turned by an angle $\alpha 1+\alpha 2$ relative to its initial rest position. The same phenomenon occurs when the deflection element 1 swings over in the other direction and when the other double abutment 20$b$ cooperates with it, enabling two other mechanically defined angular positions.

Figure 6D:
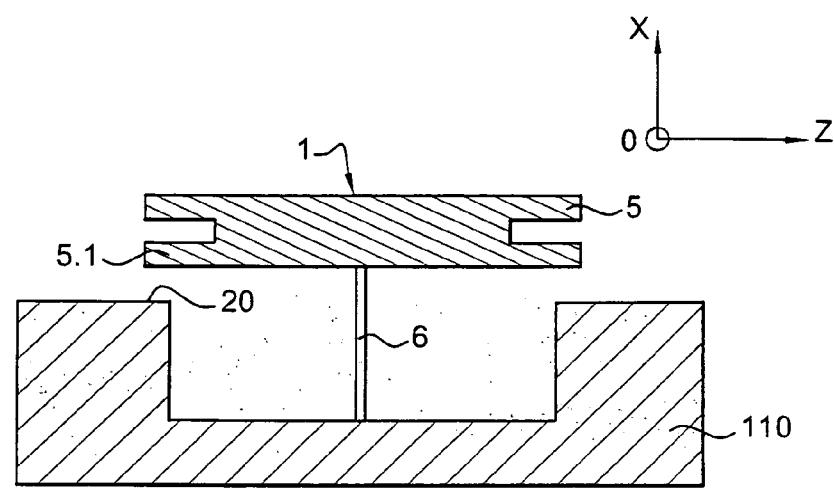
Figure 6E:
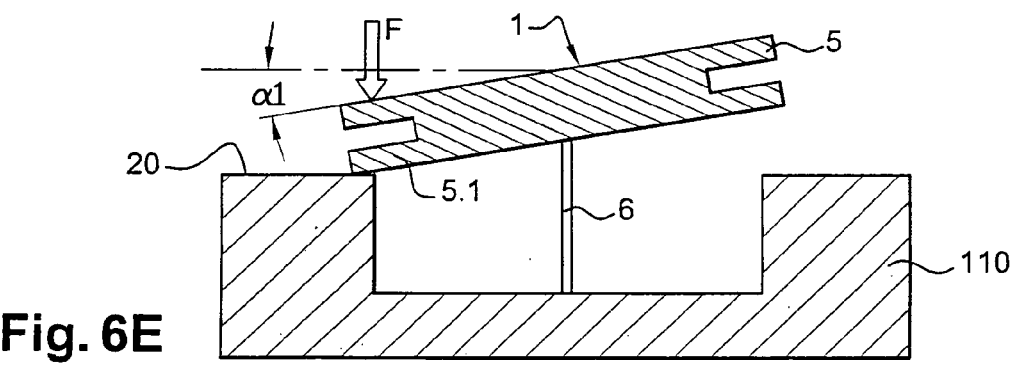
Figure 6F:
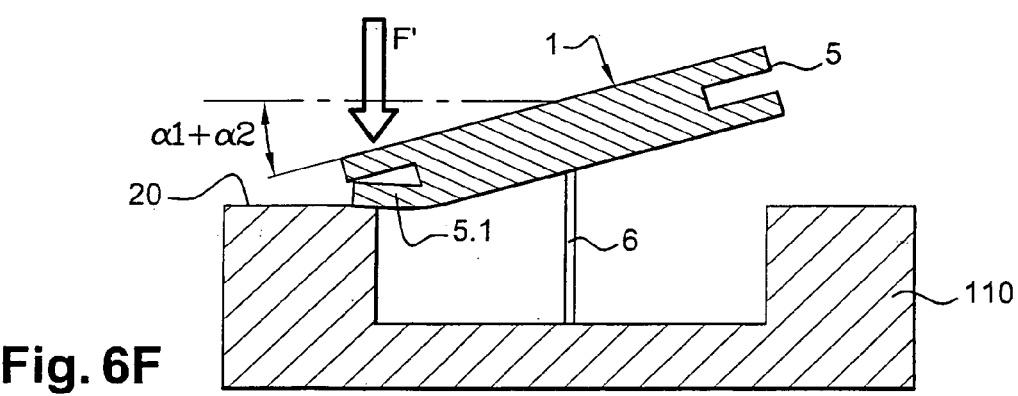

An alternative of this embodiment is illustrated in FIGS. 6D to 6F. Instead of this being the abutment which comprises a tab, it is now the deflection element 1 which is equipped with at least one tab 5.1 which, when it cooperates with a single abutment 20 integral with the substrate 110, is capable of assuming two distinct positions. In FIG. 6D, the deflection element 1 is in the rest position, one of its abutments 5.1 being in contact with the abutment 20 of the substrate 110. In FIG. 6E, the deflection element has pivoted by an angle $\alpha 1$ and the tab 5.1 has come into contact with the abutment 20 of the substrate. A force F has been applied to the deflection element 1 in the vicinity of the tab 5.1. From this position, if a sufficient force F' is applied to the deflection element 1 near the tab 5.1, the latter is capable of assuming another position by bending, allowing the deflection element 1 to incline by an angle $\alpha 2$ from the inclination $\alpha 1$.

Figure 7A:
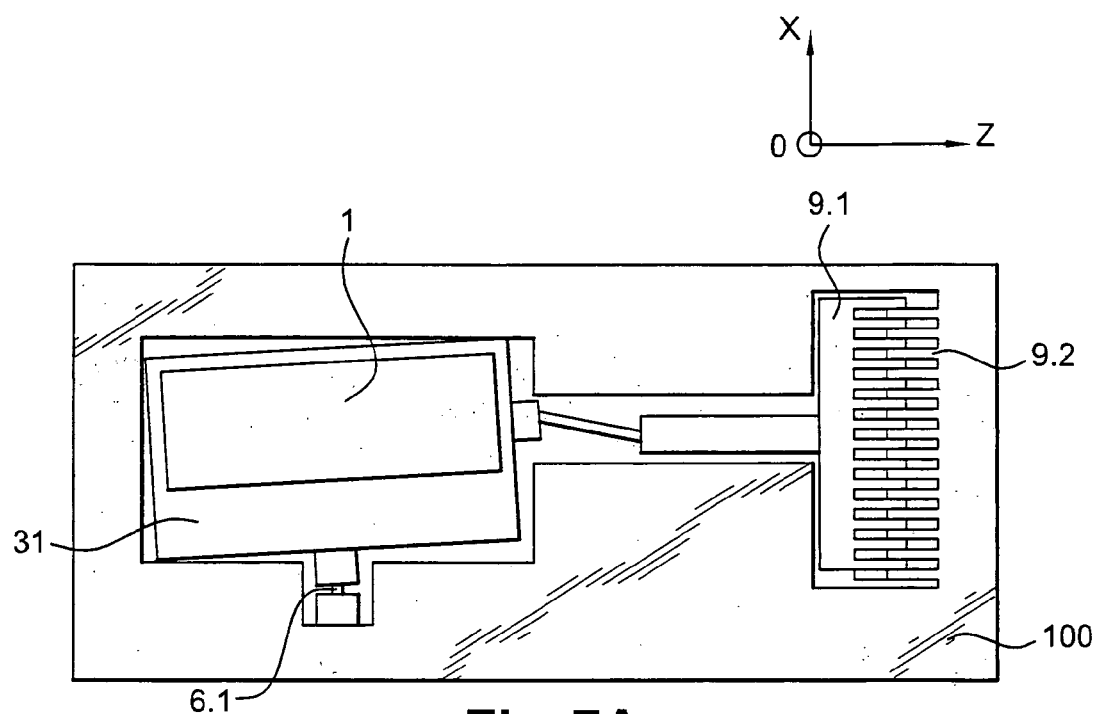
FIGS. 7A and 7B show another example of an optical deflection module, with actuating means of the interdigitated comb type, which may be used in an optical deflection matrix according to the invention.
Figure 7B:
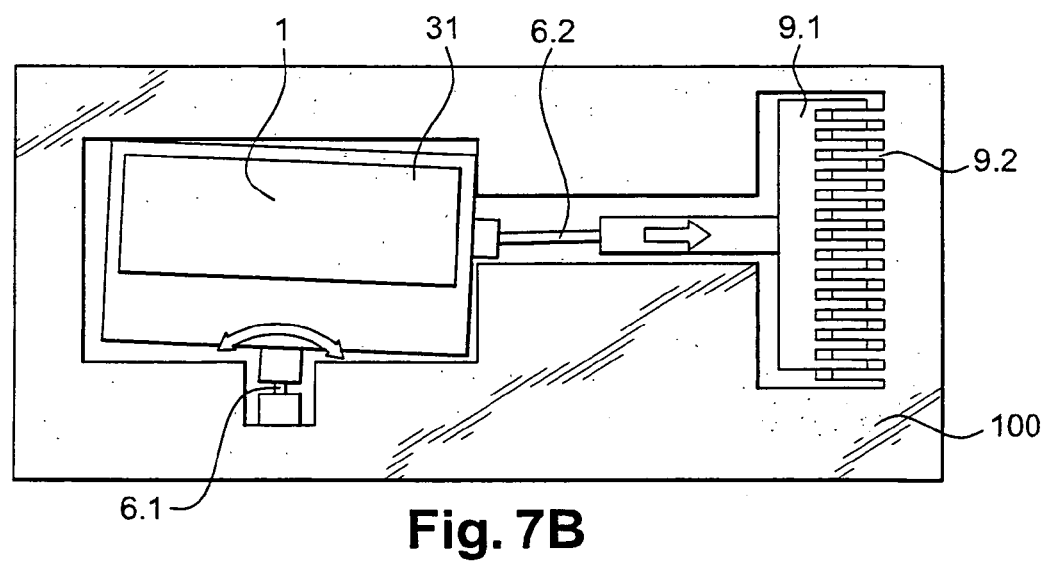

Another embodiment of the optical deflection module according to the invention will now be seen with reference to FIGS. 7A, 7B. As before, these figures represent the optical deflection module only partially, and no return element is shown. The deflection element is a mirror. The deflection element rests on a base 31 directed according to the plane xoz capable of moving in rotation about an axis substantially perpendicular to the plane xoz. The base 31 is connected by a fine tie 6.1 to the support 110. The axis of rotation passes through this tie 6.1. The means for actuating the deflection element 1 comprise two sets of combed electrodes 9.1, 9.2 designed to cooperate. The base 31 is also connected to an electrode 9.1 of the sets of combed electrodes which is mobile. This link is made by means of a link arm 6.2. The other set of combed electrodes 9.2 is fixed and integral with the support 110. The connection of the link arm 6.2 with the base 31 is offset to the connection point of the fine tie 6.1 so that displacement of the base in rotation may occur. In the figure, the base 31 is shown rectangular, the connection point of the fine tie 6.1 is located on a side of the rectangle and the connection point of the link arm 6.2 on another side. During interaction between the two sets of combed electrodes 9.1, 9.2, the mobile set of electrodes 9.1 moves in translation causing in its movement swinging of the base 31 about the axis.

Figure 8A:
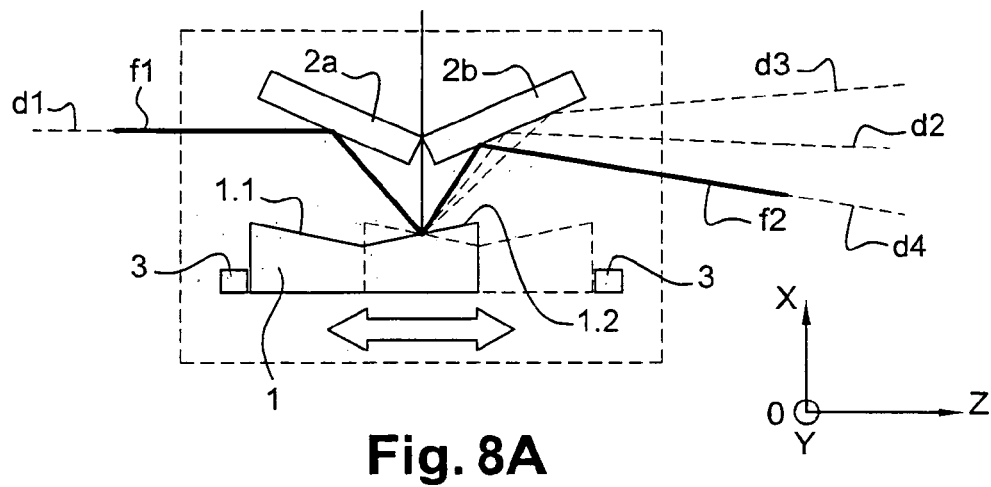
FIG. 8A illustrates an optical deflection module in which the deflection element is mobile in translation.

We shall now be concerned with another embodiment of an optical deflection module according to the invention in which, instead of moving in rotation, the deflection element 1 is capable of moving in translation. Reference is made to FIG. 8A, which is a plane view of the optical deflection module.

To date, the deflection elements of mirror type had a single reflection face. In this configuration a deflection element 1 and on either side two return elements 2$a$, 2$b$ are apparent. The deflection element 1 is of the mirror type with two reflective faces 1.1, 1.2 laid out as a V and therefore positioned in different planes. The intersection of the two reflective faces 1.1, 1.2 forms an edge which is perpendicular to the plane xoz. The potential directions d2, d3, d4 of propagation of the outgoing light beam f2 are contained in the plane xoz. The direction d1 of the incoming light beam f1 is colinear with the main potential direction d2 which is median to the potential directions d3, d4. In this example, it is the principal direction d2 which is obtained when a light beam collides with the deflection element 1 at the level of the edge of the V. The deflection element is then in its main position.

The deflection element 1 is moved in the plane xoz according to a direction parallel to at least one of the potential directions. More particularly, this translation is completed parallel to the principal direction d2 and therefore parallel to the direction d1 of the incoming light beam f1. This translation is performed between two fixed abutments 3 which embody two discrete potential end positions which are mechanically defined and delimit the set of potential positions. These end positions result in the two potential directions d3 and d4. The principal direction is a median direction. The means for actuating the deflection element may be embodied by pairs of electrodes similar to those of FIGS. 4A, 4B. The fixed electrodes would be localised on the abutments 3 and the mobile electrodes on the end faces of the deflection element, opposite the fixed electrodes. The electrodes have not been shown so as not to crowd the figure. This deflection module is of course likewise reversible.

Figure 8B:
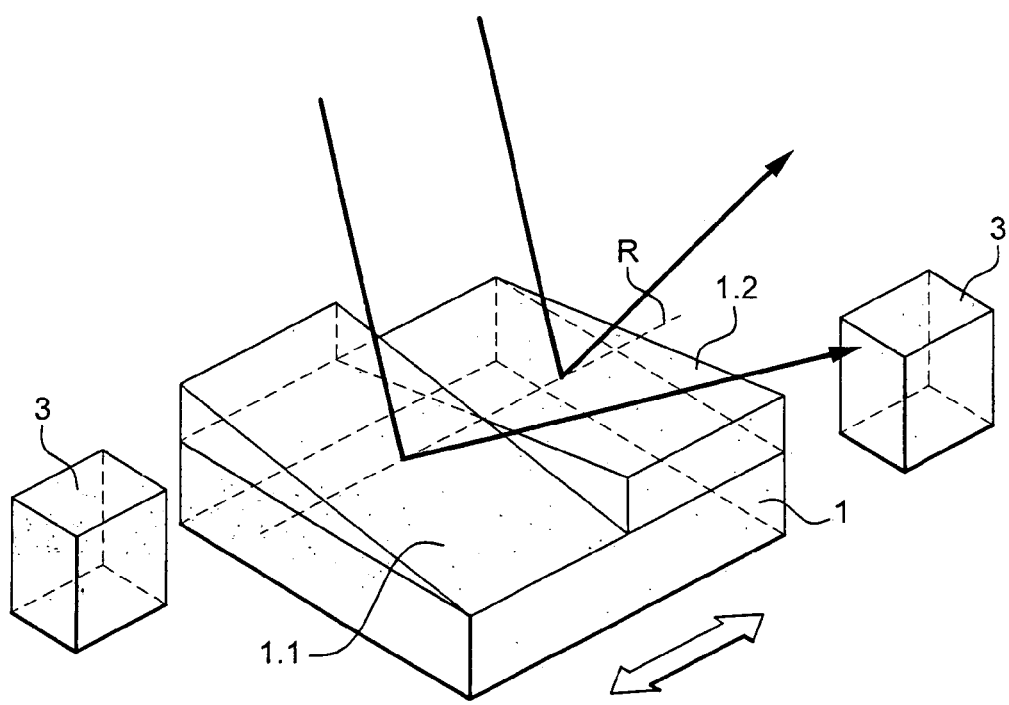
FIG. 8B shows a deflection element capable of being substituted for the deflection element of FIG. 8A, these optical deflection modules may be used in an optical deflection matrix according to the invention.

FIG. 8B shows only another embodiment of the deflection element 1 capable of replacing that of FIG. 8A. Instead of moving in translation parallel to one of the potential directions, it is capable of moving in translation perpendicularly to at least one of the potential directions. In this example it is always the principal direction d2. The deflection element comprises, in this example, two reflective faces 1.1, 1.2 inclined according to different planes whereof the intersection defines an axis R. The axis R is an axis of rotation of the reflective faces 1.1, 1.2. These faces are side by side in the direction of the displacement and head to foot. The direction of the displacement is parallel to the axis R of rotation. The translation of said faces 1.1, 1.2 according to the direction is equivalent to rotation of said faces 1.1, 1.2 according to the axis R.

Figure 9:
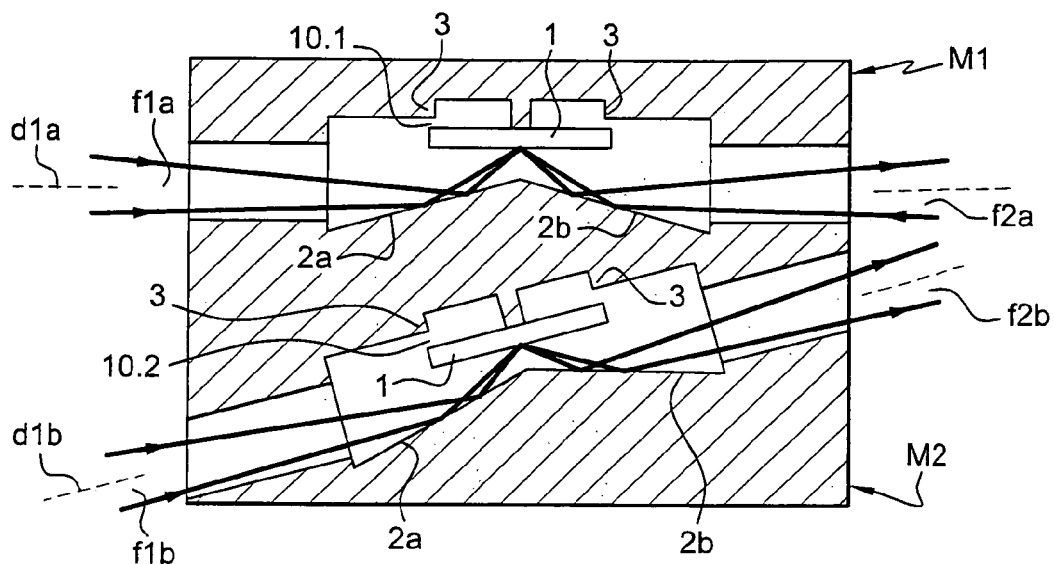
FIG. 9 illustrates an optical deflection matrix according to the invention whereof the incoming and outgoing light beams are not parallel to one another.

FIG. 9 illustrates an alternative of a matrix with two optical deflection modules M1, M2. This optical deflection matrix comprises two optical deflection modules positioned in columns with for each: a deflection element 1 and two return elements 2$a$, 2$b$. In this embodiment, the directions d1$a$, d1$b$ of the input beams f1$a$, f1$b$ are not parallel to one another. The same applies for the directions (not designated) of the output beams f2$a$, f2$b$ leaving the modules M1, M2. The deflection elements 1 are mirrors with a reflection face and in the rest position the reflection faces are not parallel to one another.

In addition, the clearance space of the deflection elements 1 is not identical from one optical deflection module M1 to the other M2. The abutments 3 which embody mechanically determined end positions of the two deflection elements 1 are not identical. Their thickness is different and, in the rest position, the space 10.1, 10.2 which separates the deflection element 1 from an abutment 3 is not the same from one optical deflection module M1 to the other M2. In the example the space 10.1 present in the module M1 is smaller than the space 10.2 present in the module M2. This characteristic might have been present in the optical deflection matrices of the preceding examples.

Figure 3C:
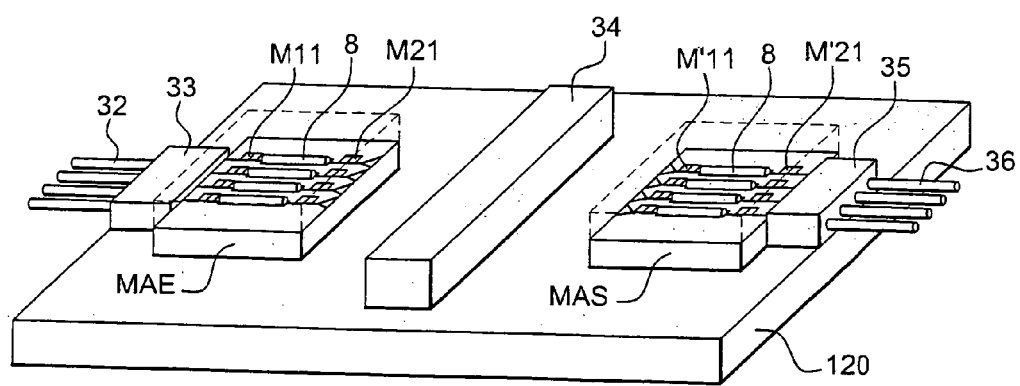

Reference is now made back to the description of a routing device with reference to FIGS. 3A to 3C. The routing device of FIG. 3A is a point-by-point routing device, and has a very simple structure with two input channels and two output channels.

This routing device may couple each of n (two) optical input channels 32 to any one of n' (two) output channels optical 36. In more general terms, the number of input channels n is not inevitably equal to the number n' of output channels. The number of input channels n is less than or equal to the number n' of output channels.

This routing device comprises, in tandem, an optical input deflection matrix MAE connected to the optical input channels 32, a link module 34, an optical output deflection matrix MAS connected to the optical output channels 36. The input channels 32 are embodied in this example by optical fibres. They are capable of each conveying an incoming light beam f1a, f1b penetrating the optical input deflection matrix MAE. All the optical deflection modules making up the optical input deflection matrix MAE and the optical output deflection matrix MAS are positioned in the same plane xoz or in parallel planes. The optical deflection modules Ma, Mb of the input matrix MAE and the optical deflection modules M'a, M'b of the output matrix MAS two-by-two form lines which are parallel.

The optical input deflection matrix MAE has already been described hereinabove. The directions of propagation of the input beams f1a, f1b are colinear with a potential direction of propagation of the output beams f2a, f2b.

The link module 34 is designed to group together in a one-to-one correspondence the l potential directions of the optical input deflection matrix MAE onto l points of spatial focus. It is capable of generating k×l intermediate light beams 37 of directions within a set of l directions. It may be formed with one or more lenses or with one or more mirrors.

The optical output deflection matrix MAS is similar to the optical input deflection matrix MAE but functions inversely. It is capable of intercepting the k×l intermediate light beams 37 (which represent its incoming light beams) and generating from these k×l intermediate light beams 37, j outgoing light beams 38 which are all parallel to the k incoming light beams f1a, f1b of the input matrix MAE. These j outgoing light beams 38 may be conveyed by output optical fibres 36 embodying the optical output channels. The number j is equal to the number l. Generally, j is equal to k.

More specifically, each optical deflection module M'a, M'b receives an incoming beam (an intermediate beam 37); this intermediate beam 37 may propagate according to a direction taken from among l potential directions. These directions are a function of the l potential directions of the output beams f2a, f2b of the input matrix MAE and more particularly of the potential positions taken by the outgoing light beam f2a which passes through the link module 34 to be intercepted by the module M'a. Each optical deflection module M'a, M'b provides an output beam 38 propagating according to a given fixed direction which is the direction of the input beams f1a, f1b of the input matrix MAE. This output matrix MAS has a role of divider of angular positions. The input beams in the input matrix MAE are contained in one plane. The output beams of the input matrix MAE are contained in another plane. The planes are parallel or coincide.

The input beams 37 in the output matrix MAS are contained in one plane. The output beams 38 of the output matrix MAS are contained in another plane. The planes are coincident or parallel. In addition, the plane of the output beams of the input matrix and the plane of the input beams of the output matrix MAS are likewise coincident or parallel.

Prior to penetrating the input matrix MAE, the k incoming light beams f1a, f1b pass through a shaping module 33. The shaping module 33 is used for imaging the light beams f1a, f1b originating from the input optical fibres 32 onto the optical deflection elements. The shaping module 33 may comprise a lens or a mirror for each of the input beams f1a, f1b. The light beams before and after shaping bear the same reference so as not to needlessly multiply the notations.

The light beams 38 which emerge from the optical output deflection matrix MAS pass through an output shaping module 35. This output shaping module 35 is similar to the input shaping module 33 and it has the same role. The output beams 38 of the output matrix MAS and the output beams 38 of the output shaping module 35 have been referenced in the same way.

FIGS. 3B and 3C illustrate in a plane view and in three dimensions a routing device slightly more complex with four optical input channels and four optical output channels parallel to one another. The input matrix MAE is comparable to that illustrated in FIG. 4A. The output matrix MAS is comparable to the input matrix MAE but it functions inversely. The input matrix has a role of a multiplier of potential directions and the output matrix MAS plays the part of a divider of potential directions.

In this way, in this example, with two discrete mechanically determined positions for each optical deflection module, the input beams of the optical deflection modules M11 of the first column of the input matrix MAE have a given fixed direction.

The output beams of the optical deflection modules M11 of the first column of the optical input deflection matrix MAE are capable of assuming two discrete mechanically determined potential directions.

The input beams of the optical deflection modules M21 of the second column of the input matrix MAE are capable of assuming two discrete mechanically determined potential directions.

The output beams of the optical deflection modules M21 of the second column of the input matrix MAE are capable of assuming four discrete mechanically determined potential directions.

The input beams of the optical deflection modules M'11 of the first column of the output matrix MAS are capable of assuming four discrete mechanically determined potential directions.

The output beams of the optical deflection modules M'11 of the first column of the optical output deflection matrix MAS are capable of assuming two discrete mechanically determined potential directions.

The input beams of the optical deflection modules M'21 of the second column of the output matrix MAS are capable of assuming two discrete mechanically determined potential directions.

The output beams of the optical deflection modules M'21 of the second column of the output matrix MAS are capable of assuming one given fixed direction.

FIG. 3C shows, supported by a common substrate 120, in cascade, an input shaping module 33 having the appearance of a small bar, an input matrix MAE (similar to that in FIG. 4A), a link module 34 having the appearance of a small bar, an output matrix MAS (similar to that in FIG. 4A), an output shaping module 35 having the appearance of a small bar. Optical fibres 32 are connected at the input of the input shaping module 33, optical fibres 36 emerge from the output shaping module 35.

Figure 10:
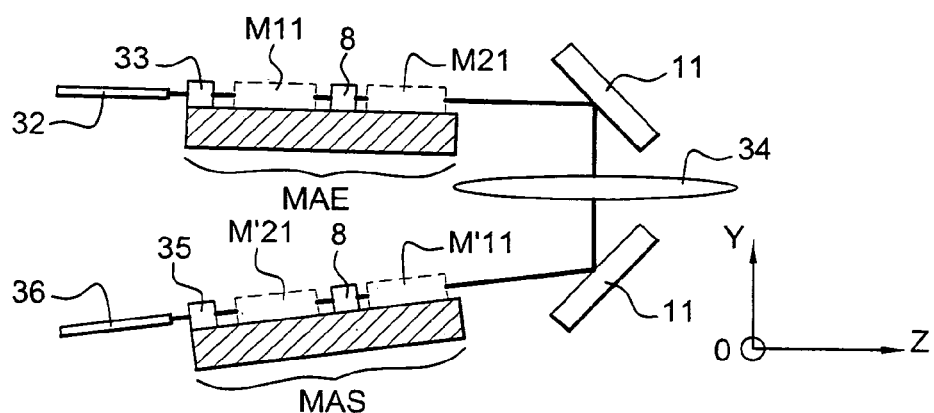
FIG. 10 illustrates a routing device according to the invention in which the optical deflection matrices are in non-parallel planes.

The input MAE and output matrices MAS of a routing device according to the invention are not always coplanar or placed in parallel planes as illustrated in FIG. 10. At least one return device 11 may be inserted either upstream, or downstream from the link module 34, that is, either between the optical input deflection matrix MAE and the link module 34, or between the link module 34 and the optical output deflection matrix MAS. In the example of FIG. 10, there is a return device 11 on each side of the link module 34.

Even though a certain number of exemplary embodiments of the present invention have been shown and described in detail, it will be understood that different changes and modifications may be made without departing from the scope of the invention.

REFERENCES

[1] << Scalable optical cross-connect switch using micro-machined mirrors >> Paul M HAGELIN and al, IEEE Photonics Technologies letters, vol. 12, No. 7, July 2000, pages 882-884.

[2] FR-A-2 821 678.

[3] FR-A-2 821 681

The invention claimed is:

1. An optical deflection matrix comprising:
at least two optical deflection modules each configured to provide:
from an incoming light beam having a given direction of propagation an outgoing light beam having a direction of propagation taken in a first set of potential directions, or
from an incoming light beam having a direction of propagation taken in a second set of potential directions an outgoing light beam having a given direction of propagation,
wherein each optical deflection module comprises an own single deflection element of the incoming light beam configured to assume plural potential positions that are in relation to the potential directions of the first set or of the second set and two fixed return elements positioned on either side of the deflection element, a main potential position of the deflection element leading to a principal direction of the first set or of the second set, the principal direction being colinear with the given direction of propagation of the incoming light beam or of the outgoing light beam, the principal directions of the optical deflection modules being located in a same plane.

2. The optical deflection matrix as claimed in claim 1, wherein the given direction is a fixed direction or is taken from among plural potential directions.

3. The deflection matrix as claimed in claim 1, wherein the first or the second set of potential directions comprises discrete predetermined directions.

4. The optical deflection matrix as claimed in claim 1, wherein the deflection element of at least one module includes a mirror.

5. The optical deflection matrix as claimed in claim 1, wherein at least one potential position of the deflection element of at least one module is a mechanically predetermined discrete position.

6. The deflection matrix as claimed in claim 5, wherein an abutment defines the at least one mechanically predetermined position of the deflection element of a module by stopping the deflection element.

7. The deflection matrix as claimed in claim 6, wherein the abutment is a double abutment comprising a tab configured to assume two distinct positions, the tab being deflected in one of the two distinct positions.

8. The deflection matrix as claimed in claim 6, wherein a tab is integral with the deflection element, the tab configured to assume two distinct positions in support on the abutment, the tab being deflected in one of the two distinct positions.

9. The deflection matrix as claimed in claim 1, wherein the main potential position of the deflection element is a position in which the deflection element is at rest.

10. The deflection matrix as claimed in claim 1, wherein the deflection element of a module is configured to move in rotation about an axis perpendicular to at least one of the potential directions.

11. The deflection matrix as claimed in claim 1, wherein the deflection element of a module is configured to move in rotation about an axis contained in the plane formed by the given direction and the main potential direction.

12. The deflection matrix as claimed in claim 1, wherein the deflection element of a module comprises at least two reflective faces positioned in different planes and configured to move in translation so as to generate a rotation of the planes according to an axis formed by the intersection of the planes.

13. The optical deflection matrix as claimed in claim 1, wherein the deflection element of a module comprises a link arm that connects the deflection element to a fixed part.

14. The optical deflection matrix as claimed in claim 1, wherein the deflection element of at least one module is on a mobile base.

15. The optical deflection matrix as claimed in claim 14, wherein the mobile base is integral with a link arm that connects the mobile base to a fixed part.

16. The optical deflection matrix as claimed in claim 1, further comprising means for actuating the deflection element of a module of electrostatic type comprising at least one pair of electrodes, or at least one pair of electrodes in interdigitated combs.

17. The optical deflection matrix as claimed in claim 1, further comprising conduits for guiding the incoming and outgoing light beams.

18. The optical deflection matrix as claimed in claim 1, at least partially made by techniques used in microelectronics.

19. The optical deflection matrix as claimed in claim 1, at least partially made by molding techniques.

20. The optical deflection matrix as claimed in claim 1, at least partially made by transfer techniques.

21. The optical deflection matrix as claimed in claim 1, wherein the two return elements of a module are symmetrical relative to a plane perpendicular to the main direction of potential propagation.

22. The optical deflection matrix as claimed in claim 1, wherein the modules are placed in the same plane.

23. The optical deflection matrix as claimed in claim 1, wherein each deflection element of a module includes a deflection plane, the deflection planes of the deflection elements in their main position being parallel or coincident.

24. The optical deflection matrix as claimed in claim 1, wherein the optical deflection modules are positioned in at least one line and/of or at least one column.

25. The optical deflection matrix as claimed in claim 24, wherein two successive optical deflection modules in a line are separated by an optical conjugation element.

26. The optical deflection matrix as claimed in claim 25, further comprising, in the same line, optical conjugation elements, the optical deflection modules comprising two return elements, and the optical conjugation elements having colinear optical axes.

27. The optical deflection matrix as claimed in claim 1, comprising plural optical deflection modules in a column, the light beams having each a fixed direction of propagation, and the directions of propagation are in parallel.

28. The optical deflection matrix as claimed in claim 1, comprising plural columns, the optical conjugation elements separating two optical deflection modules belonging to successive columns combined in a small bar.

29. The optical deflection matrix as claimed in claim 1, wherein the return elements of the deflection modules are grouped on a same substrate.

30. The optical deflection matrix as claimed in claim 29, wherein the substrate includes at least one compartment for an optical conjugation element.

31. The optical deflection matrix as claimed in claim 29, wherein the deflection elements of the modules are grouped on the substrate.

32. The optical deflection matrix as claimed in claim 29, wherein in at least one module, the deflection element is placed opposite to the return elements.

33. The optical deflection matrix as claimed in claim 29, wherein at least one part of the deflection modules is grouped on a common substrate, the common substrate comprising means for supporting remainder of the modules and at least one compartment for one or more optical conjugation elements.

34. A routing device configured to couple each of a plurality of optical input channels with any one of a plurality of optical output channels conveying light beams, comprising:

an optical input deflection matrix as claimed in claim 1, connected to the optical input channels, an optical output deflection matrix as claimed in claim 1, connected to the optical output channels, and a link module between the two input and output matrices.

35. The routing device as claimed in claim 34, further comprising, upstream from the optical input deflection matrix, a shaping module of light beams conveyed by the input channels.

36. The routing device as claimed in claim 34, further comprising, downstream from the optical output deflection matrix, a module for shaping the light beams to be conveyed by the output channels.

37. The routing device as claimed in claim 34, wherein the optical input channels and the optical output channels are parallel to one another.

38. The routing device as claimed in claim 34, wherein at least one return device is placed between the optical input deflection matrix and the link module or between the link module and the optical output deflection matrix.

39. The optical deflection matrix as claimed in claim 24, wherein the optical deflection modules are positioned in at least one line and at least one column.

40. The routing device as claimed in claim 38, wherein at least one return device is placed between the optical input deflection matrix and the link module and between the link module and the optical output deflection matrix.

* * * * *